(12) United States Patent
Nishida

(10) Patent No.: US 9,947,213 B2
(45) Date of Patent: Apr. 17, 2018

(54) ON-VEHICLE EMERGENCY NOTIFICATION DEVICE AND COMMUNICATION SYSTEM

(71) Applicant: TOYOTA JIDOSHA KABUSHIKI KAISHA, Toyota-shi, Aichi-ken (JP)

(72) Inventor: Junichi Nishida, Miyoshi (JP)

(73) Assignee: TOYOTA JIDOSHA KABUSHIKI KAISHA, Toyota (JP)

(\*) Notice: Subject to any disclaimer, the term of this patent is extended or adjusted under 35 U.S.C. 154(b) by 0 days.

(21) Appl. No.: 15/326,351

(22) PCT Filed: Jul. 16, 2015

(86) PCT No.: PCT/IB2015/001200
§ 371 (c)(1),
(2) Date: Jan. 13, 2017

(87) PCT Pub. No.: WO2016/012847
PCT Pub. Date: Jan. 28, 2016

(65) Prior Publication Data
US 2017/0206777 A1 Jul. 20, 2017

(30) Foreign Application Priority Data
Jul. 23, 2014 (JP) .................................. 2014-149688

(51) Int. Cl.
*G08B 25/14* (2006.01)
*G08B 29/12* (2006.01)
(Continued)

(52) U.S. Cl.
CPC .............. *G08B 29/12* (2013.01); *G08B 5/38* (2013.01); *G08B 25/14* (2013.01); *H04L 43/0817* (2013.01); *G08B 25/12* (2013.01)

(58) Field of Classification Search
None
See application file for complete search history.

(56) References Cited

U.S. PATENT DOCUMENTS

| 6,087,942 A | 7/2000 | Sleichter, III et al. |
| 6,375,630 B1 | 4/2002 | Cutler et al. |

(Continued)

FOREIGN PATENT DOCUMENTS

| JP | S64-44160 A | 2/1989 |
| JP | H10-187476 A | 7/1998 |

(Continued)

*Primary Examiner* — K. Wong
(74) *Attorney, Agent, or Firm* — Oliff PLC

(57) ABSTRACT

An emergency notification device performs emergency notification to send an emergency notification to a notification center when an urgent event is generated on a vehicle, and test notification to diagnose whether the emergency notification can be performed, through a notification button that is a part of one user interface. This device has a normal mode in which emergency notification can be performed, and a test mode in which test notification can be performed, through an operation of the notification button, as well as a transit mode in which transition from the normal mode to the test mode can be performed with a predetermined vehicle operation in the normal mode as a trigger. The emergency notification device performs informing processing, which differs from mode to mode, through indicators and that are another part of the one user interface.

10 Claims, 7 Drawing Sheets

(51) Int. Cl.
*G08B 5/38* (2006.01)
*H04L 12/26* (2006.01)
*G08B 25/12* (2006.01)

(56) References Cited

U.S. PATENT DOCUMENTS

| | | | |
|---|---|---|---|
| 6,954,135 B1 | 10/2005 | Yoshioka et al. | |
| 8,340,830 B2 * | 12/2012 | Hayes | G06F 1/3203 |
| | | | 340/539.13 |
| 9,153,117 B2 * | 10/2015 | Sennett | G08B 27/006 |
| 2017/0053509 A1 * | 2/2017 | Mangum | G08B 21/0269 |

FOREIGN PATENT DOCUMENTS

| | | |
|---|---|---|
| JP | 2000-049975 A | 2/2000 |
| JP | 2000-285350 A | 10/2000 |
| JP | 2009-253350 A | 10/2009 |
| JP | 2010-282445 A | 12/2010 |

* cited by examiner

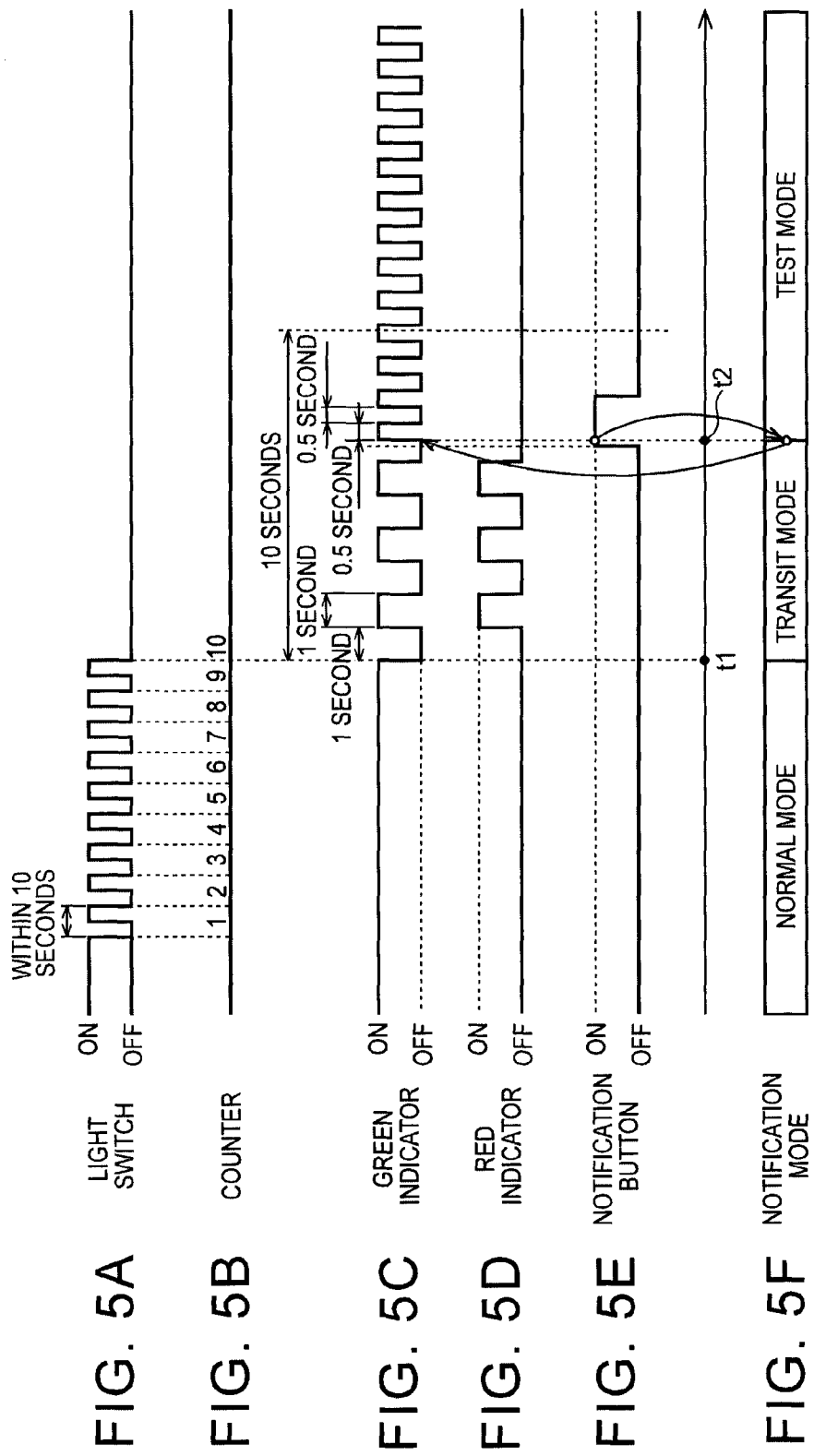

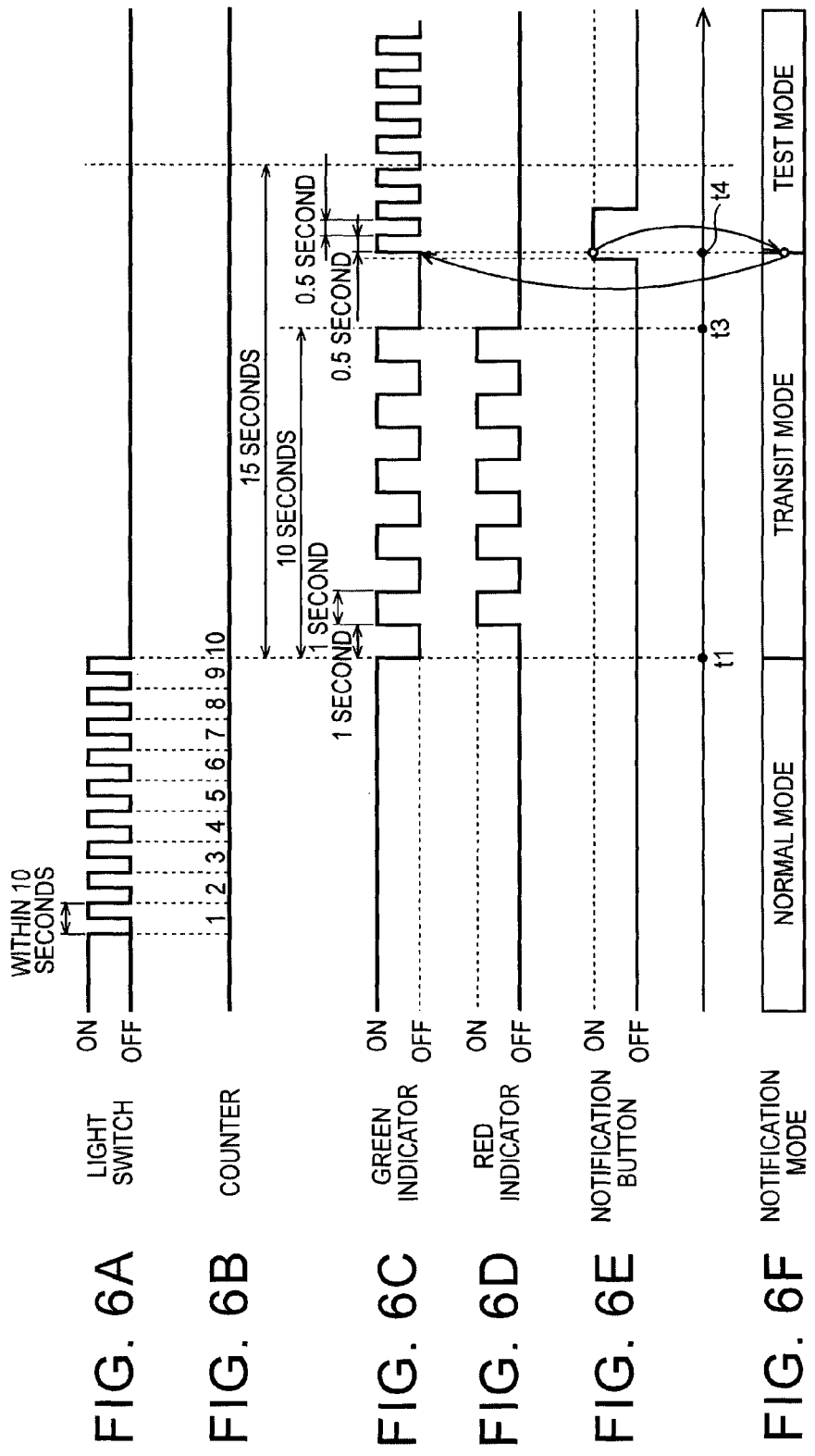

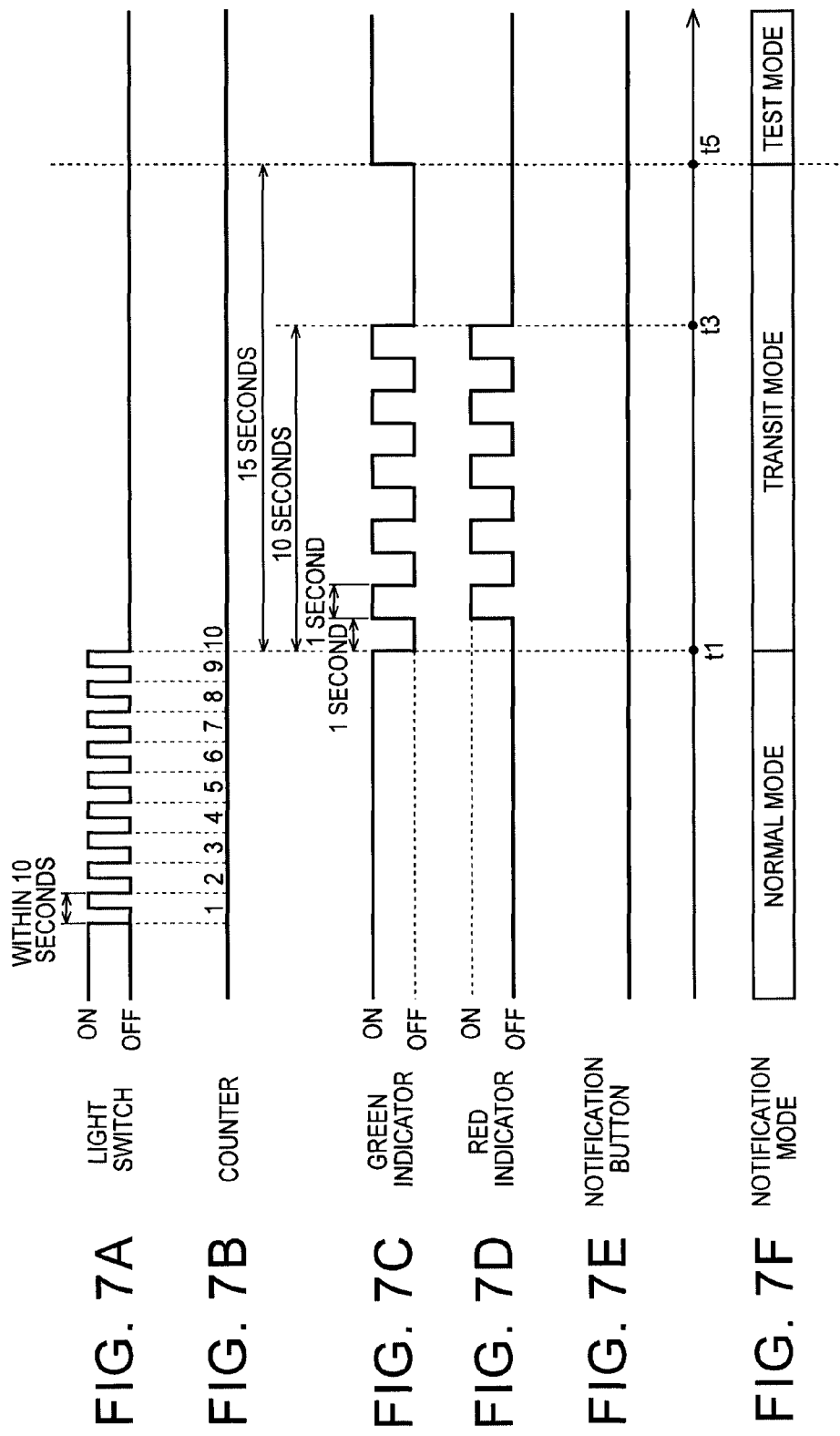

ON-VEHICLE EMERGENCY NOTIFICATION DEVICE AND COMMUNICATION SYSTEM

BACKGROUND OF THE INVENTION

1. Field of the Invention

The present invention relates to an on-vehicle emergency notification device that notifies about an occurrence of an emergency event, such as a vehicle accident or collision, from a vehicle to a notification center.

2. Description of Related Art

As an on-vehicle emergency notification device, the device disclosed in Japanese Patent Application Publication No. 2000-285350 (JP 2000-285350 A) is known. This device can wirelessly send and receive various types of information to and from the notification center. When an emergency event occurs, the device can wirelessly send information, such as the current vehicle's position, to the notification center via an emergency notification to request the police or the firehouse to send an emergency vehicle. In addition to sending an emergency notification, the device can send a test notification to make an operation test.

Conventionally, this type of device, including the device described in Japanese Patent Application Publication No. 2000-285350, a test notification is sent only during the development stage of the device in most cases and, at that time, an emergency notification is never sent. Recently, however, a vehicle having such a device mounted thereon is required to have the ability to send a test notification not only during the development stage but also after going on the market. In this case, because a test notification is sent also to a public notification center, the two types of notification, an emergency notification and a test notification, must be clearly distinguished during the practical operation considering the nature of the system. However, due to the cost and the mounting space, the notification device is not usually equipped with a user interface that distinguishes between these two types of notification. One possible solution to this problem is to provide a button to start emergency notification or test notification and, via that switch, emergency notification and test notification are switched according to the operation mode. However, an erroneous determination of such an operation mode may lead to a situation in which a test notification is accepted erroneously as an emergency notification.

SUMMARY OF THE INVENTION

The present invention provides an on-vehicle emergency notification device capable of avoiding erroneous notification between emergency notification and test notification using one device (user interface).

A first aspect of the present invention relates to an on-vehicle emergency notification device that performs emergency notification and test notification through one user interface. the on-vehicle emergency notification device includes an electronic control unit that has a normal mode, a test mode, and a transit mode and is configured to cause an informing unit to perform informing processing that is different for each of the normal, test and transit modes, the normal mode being a mode in which the emergency notification can be performed to send an emergency notification signal to a center in response to an operation of an operation unit that is a part of the one user interface when an urgent event occurs on a vehicle, the test mode being a mode in which the test notification is performed to diagnose whether the emergency notification can be performed in response to the operation of the operation unit, the transit mode being a mode in which transition from the normal mode to the test mode can be performed, the transit mode being triggered by a predetermined vehicle operation, the informing unit being another part of the one user interface.

A second aspect of the present invention relates to a communication system. The communication system includes an operation unit that detects a user operation, a communication device that includes at least a first operation mode, a second operation mode, and a third operation mode and performs a predetermined operation according to the operation mode, the first operation mode being a mode in which predetermined communication is carried out when the operation unit is operated, the second operation mode being a mode in which a capability to perform the predetermined communication is tested, the third operation mode being a mode in which the operation mode can be switched from the first operation mode to the second operation mode, and an informing unit that performs informing processing in a manner that is different for each of the first, second and third operation modes.

According to the above aspects, transition to the test mode, in which test notification can be performed, is performed using the period of this transit mode. Therefore, erroneous notification between emergency notification and test notification can be suitably avoided. The guide to each of the notification modes is given by the informing processing of the informing unit that differs from informing mode to informing mode. Therefore, the operator knows in which mode the emergency notification device is operating now. In addition, this function of the emergency notification device can be implemented without having to add a new user interface.

In the above aspects, the transit mode may be performed from the normal mode to the test mode only during a predetermined period of time after occurrence of the predetermined vehicle operation. According to the above aspect, if the predetermined time elapses without performing any operation after transition to the transit mode, a timeout is generated and the mode is returned from the transit mode to the normal mode. This allows the operator to send an emergency notification in the normal mode.

In the above aspects, the predetermined period of time may include an additional period of time after the informing processing corresponding to the transit mode is terminated. According to the above aspect, this additional period of time in the transit mode results in an increased chance of transiting to the test mode. Providing this additional period of time suitably avoids a situation in which the operator, who intends to send a test notification in the transit mode, erroneously sends an emergency notification.

In the above aspects, the operation unit may be a pushbutton switch. According to the above aspect, this pushbutton switch makes the emergency notification device more general and enables the operator to start emergency notification and test notification using a user interface more popular in configuration and superior in operability.

In the above aspects, the electronic control unit may transition to the test mode in a case where the pushbutton switch is held for at least a predetermined time while in the transit mode.

According to the above aspect, the mode transits to the test mode in such a way that the operator holds the operation unit for a predetermined time or longer to sufficiently reflect operator's intention.

In the above aspects, the informing unit may be configured by illuminants.

In the above aspects, the informing unit may include a first informing unit that informs about a normal operation of the communication device and a second informing unit that informs about a failure in the communication device.

According to the above aspect, informing processing that differs from mode to mode can be easily implemented.

In the above aspects, the informing processing performed by the informing unit that is different for each of the normal, test and transit modes may include different blinking modes of the illuminants.

According to the above aspect, based on a blinking mode of the illuminants, the operator intuitively knows the contents of the notification mode corresponding to the blinking mode.

In the above aspects, the predetermined vehicle operation that is a trigger to the transit mode may be a special vehicle operation that is less likely performed in usual driving.

In general, the transit mode is less frequently used. Therefore, as in the above aspect, the predetermined vehicle operation can be used as a special operation to reduce the possibility with which the mode transits inadvertently to the transit mode. Conversely, such a special operation can be used to allow the operator to reliably transit to the transit mode.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 5A shows a change in the on/off operation of the light switch in a timing diagram that shows an example of an operation performed when the operation unit is operated to transit to the test mode during execution of informing processing corresponding to the transit mode;

FIG. 5B shows a change in the count value of on/off switching operations of the light switch;

FIG. 5C shows a change in the on/off operation of the green indicator;

FIG. 5D shows a change in the on/off operation of the red indicator;

FIG. 5E shows a change in the on/off operation of the notification button;

FIG. 5F shows a change in the notification mode;

FIG. 6A shows a change in the on/off operation of the light switch in a timing diagram that shows an example of an operation performed when the operation unit is operated in the transit mode to transit to the test mode after the informing processing corresponding to the transit mode is terminated;

FIG. 6B shows a change in the count value of on/off switching operations of the light switch;

FIG. 6C shows a change in the on/off operation of the green indicator;

FIG. 6D shows a change in the on/off operation of the red indicator;

FIG. 6E shows a change in the on/off operation of the notification button;

FIG. 6F shows a change in the notification mode;

FIG. 7A shows a change in the on/off operation of the light switch in a timing diagram that shows an example of an operation performed when the operation unit is not operated in the transit mode and the mode does not transit to the test mode;

FIG. 7B shows a change in the count value of on/off switching operations of the light switch;

FIG. 7C shows a change in the on/off operation of the green indicator;

FIG. 7D shows a change in the on/off operation of the red indicator;

FIG. 7E shows a change in the on/off operation of the notification button; and

FIG. 7F shows a change in the notification mode.

DETAILED DESCRIPTION OF EMBODIMENTS

Figure 1:
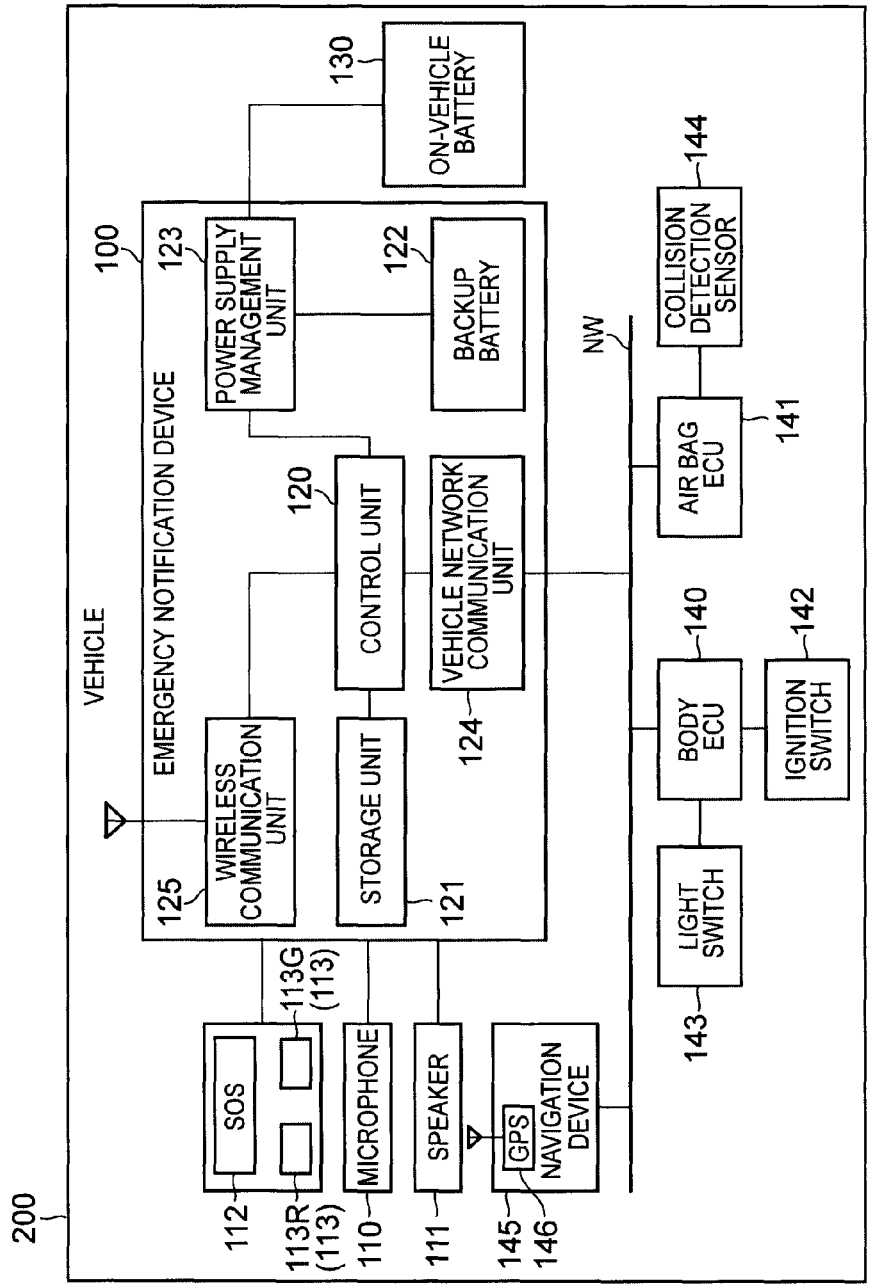
FIG. 1 is a block diagram showing a general configuration of one embodiment of an on-vehicle emergency notification device.

One embodiment of an on-vehicle emergency notification device is described below with reference to the drawings. As shown in FIG. 1, an emergency notification device (communication device) 100 in this embodiment, mounted on a vehicle 200, is a device that notifies a notification center of the generation of an emergency event such as an accident or a collision of the vehicle 200. This emergency notification device 100, capable of wirelessly sending and receiving various types of information to and from the notification center, exchanges a report and necessary information on the generation status of a collision of the vehicle 200 with an operator of the notification center via an emergency notification.

The emergency notification device 100 has a user interface used for both emergency notification and test notification. This user interface includes a microphone 110 used by the operator for voice speech, a speaker 111 from which a voice response from the notification center is output, a notification button 112 that is a pushbutton switch used for starting emergency notification and test notification, and indicators 113 that indicate whether the operation of the emergency notification device 100 is normal.

In this embodiment, the indicators 113, the illuminants, include a red indicator 113R configured by a red LED and a green indicator 113G configured by a green LED. The red indicator 113R, an indicator for informing about a failure in the emergency notification device 100, is turned on when the emergency notification device 100 fails. The green indicator 113G, an indicator for informing about the normal operation of the emergency notification device 100, is turned on when the emergency notification device is operating normally.

In addition to an emergency notification, the emergency notification device 100 can send a test notification to diagnose whether an emergency notification can be sent to the notification center. The emergency notification device 100 has the normal mode in which an emergency notification can be sent, the test mode in which a test notification can be sent, and the transit mode in which the mode can transits from the normal mode to the test mode. In other words, the emergency notification device (communication device) 100 has at least the following three modes: normal mode (first operation mode) in which predetermined communication is carried out when the notification button 112 is pressed, test mode (second operation mode) in which the communication is tested, and the transit mode (third operation mode) in which the mode can be switched from the first operation mode to the second operation mode.

The emergency notification device 100 is connected to on-board Electronic Control Units (ECUs), which control the operation of various on-vehicle devices, via a vehicle network NW such as a Controller Area Network (CAN). The emergency notification device 100 can get information about the status of the vehicle 200 based on the output from the on-vehicle ECUs.

The emergency notification device 100 includes a control unit 120 that integrally performs various types of operation processing when emergency notification or test notification described above is performed. When performing emergency notification or test notification, the control unit 120 reads from and writes to the storage unit 121 as follows. That is, the control unit 120 reads various types of information, such as the vehicle ID that is individual identification information on the vehicle 200, from the storage unit 121. The control unit 120 also writes various parameters, which are updated based on the information captured from the on-board ECUs via the vehicle network NW, to the storage unit 121. The control unit 120 identifies which notification processing, emergency notification or test notification, is to be performed based on the flag information read from the storage unit 121. The control unit 120 reads the information about the phone number of the communication destination or the information about the access destination of packet communication, which corresponds to the identified notification processing, from the storage unit 121. In addition, the control unit 120 controls the display mode of the indicators 113, which form a part of the user interface, so that the display mode of the indicators 113 differs from mode to mode. That is, the control unit 120 performs informing processing, which differs from mode to mode, via the indicators 113.

The emergency notification device 100 includes a power supply management unit 123 that manages the power supply between an on-vehicle battery 130 and a backup battery 122. The on-vehicle battery 130 functions as the main battery of the vehicle 200 from which power is supplied to various on-vehicle devices including the emergency notification device 100. On the other hand, the backup battery 122 functions as an emergency battery that secures power necessary for the vehicle to send a notification.

The emergency notification device 100 includes a vehicle network communication unit 124 that is connected to the on-vehicle ECUs described above via the vehicle network NW. The on-board ECUs include a body ECU 140 that controls the operation of a light and an air bag ECU 141 that controls the operation of an air bag when the vehicle 200 collides. The following two switches are connected to the body ECU 140: one is an ignition switch 142 that switches the on/off operation of the ignition of the vehicle 200 and the other is a light switch 143 that switches the on/off operation of the headlights of the vehicle 200. The body ECU 140 outputs the pulse signal, which is output when each of the switches 142 and 143 switches the on/off operation, to the vehicle network communication unit 124 via the vehicle network NW. A collision detection sensor 144, which detects a collision of the vehicle 200, is connected to the air bag ECU 141. The collision detection sensor 144, an acceleration sensor for detecting impact on the vehicle 200 based on the acceleration of the vehicle 200, detects a collision of the vehicle 200 when the deceleration of the vehicle 200 becomes equal to or higher than a predetermined threshold. The air bag ECU 141 outputs the detection signal, which is output when the collision detection sensor 144 detects a collision of the vehicle, to the vehicle network communication unit 124 via the vehicle network NW.

The vehicle network communication unit 124 is connected also to a navigation device 145, which guides the vehicle 200 along a route, via the vehicle network NW. A Global Positioning System (GPS) 146, which detects the traveling position of the vehicle 200, is mounted on the navigation device 145. The GPS 146 receives the GPS satellite signal for detecting the absolute position of the vehicle 200 on which the GPS 146 is mounted. The GPS 146 identifies the vehicle position based on the received GPS satellite signal. The navigation device 145 guides the vehicle 200 along a route based on the latitude/longitude information that indicates the position identified by the GPS 146. The GPS 146 outputs the latitude/longitude information, which indicates the identified position, also to the vehicle network communication unit 124 via the vehicle network NW.

The emergency notification device 100 includes a wireless communication unit 125 that wirelessly sends and receives various types of information to and from the notification center. When the collision detection sensor 144 detects a collision of the vehicle 200 and, after that, the operator presses the notification button 112, the wireless communication unit 125 receives the start command signal, provided for starting emergency notification, from the control unit 120. Upon receiving the start command signal, the wireless communication unit 125 attempts to establish communication, corresponding to emergency notification, with the notification center. On the other hand, when the collision detection sensor 144 has not yet detected a collision of the vehicle 200 and the operator presses the notification button 112 and, at that point in time, if the notification processing to be performed is emergency notification, the wireless communication unit 125 also attempts to establish communication, corresponding to the emergency notification, with the notification center. After that, when the communication corresponding to emergency notification is established with the notification center, the wireless communication unit 125 wirelessly sends the voice information, entered by the operator through the microphone 110, to the notification center. When a voice response to the vehicle 200 is received, the wireless communication unit 125 outputs the voice information to the operator through the speaker 111. This sequence of operations allows voice communication to be carried out between the operator and the operator of the notification center.

When the collision detection sensor 144 has not yet detected a collision of the vehicle 200 and the operator presses the notification button 112 and, at that point in time, if the notification processing to be performed is test notification, diagnosis is performed first to check whether the protocol for establishing communication with the notification center operates correctly on the emergency notification device 100. When this diagnosis is completed, the wireless communication unit 125 attempts to establish communication, corresponding to test notification, with the notification center. After that, if communication corresponding to test notification is established with the notification center, the wireless communication unit 125 wirelessly sends the diagnosis result, as well as the vehicle ID information, to the notification center.

Figure 2:
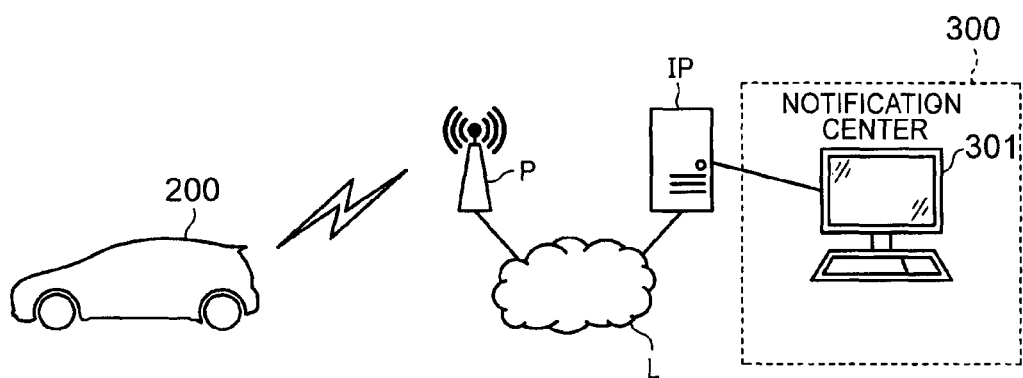
FIG. 2 is a schematic diagram showing an example of a system configuration in which the on-vehicle emergency notification device in the embodiment sends a notification to a notification center.

FIG. 2 is a diagram showing an example of the configuration of an emergency notification system for sending a notification from the vehicle 200 to a notification center 300. As shown in FIG. 2, when the operator sends an emergency notification or a test notification in this emergency notification system, the information about the notification processing is wirelessly sent from the vehicle 200 to a base station P via the mobile phone network. After that, the information wirelessly sent to the base station P is transmitted from the base station P to the notification center 300 via an Internet line L and an Internet service provider IP. The information transmitted to the notification center 300 is output to an information terminal 301 provided in the notification center 300. The information received from the information terminal 301 in the notification center 300 as a response is also sent wirelessly to the vehicle 200 via the same path.

Next, the control processing performed by the device in this embodiment is described. That is, the following describes the specific processing procedure for the display control processing performed by the emergency notification device 100 for the indicators 113 when the notification mode is switched from one mode to another.

Figure 3:
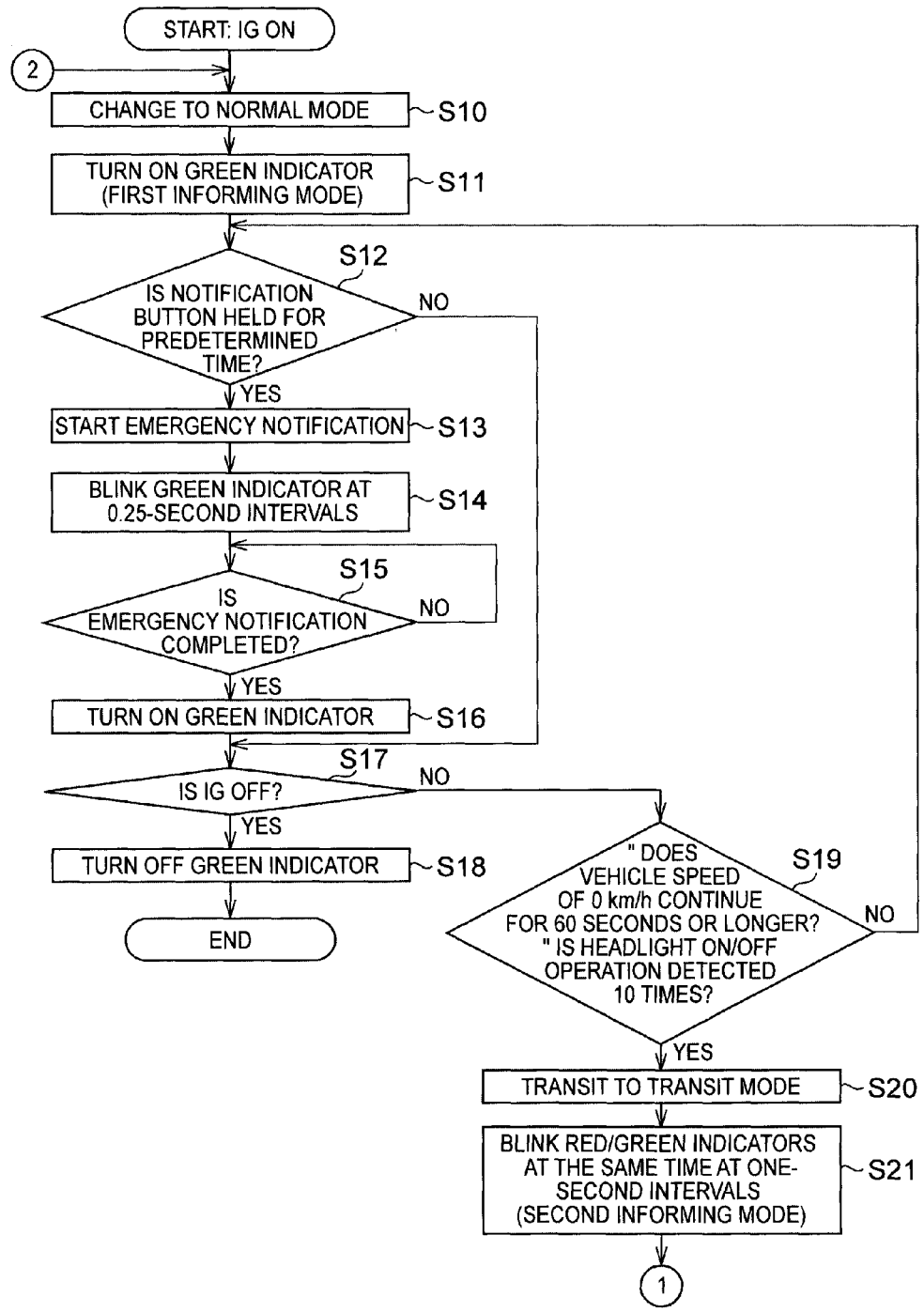
FIG. 3 is a flowchart showing a processing procedure for the informing processing performed when the on-vehicle emergency notification device in the embodiment switches the notification mode.
Figure 4:
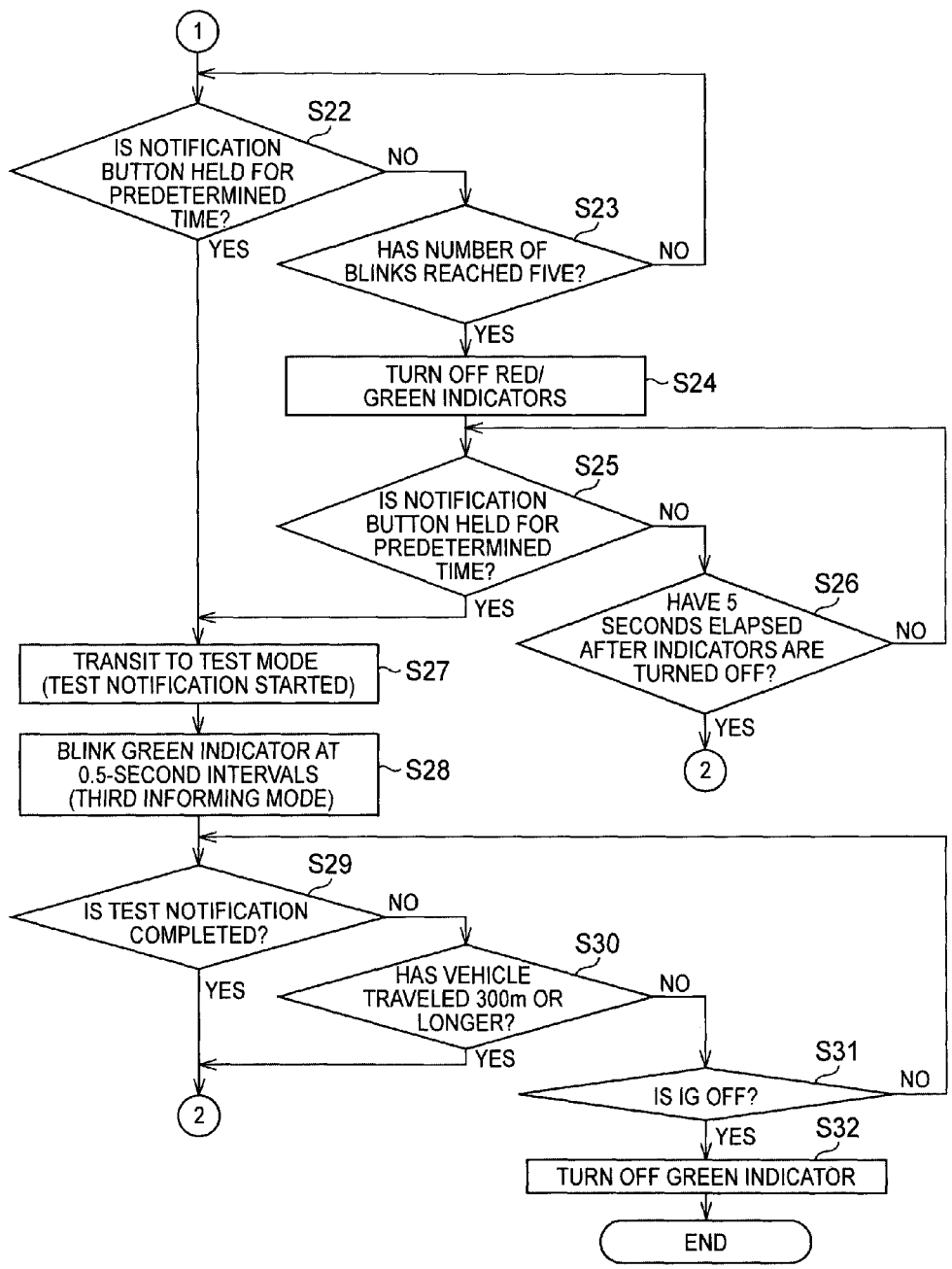
FIG. 4 is a flowchart showing a processing procedure for the informing processing performed when the on-vehicle emergency notification device in the embodiment switches the notification mode.

The emergency notification device 100 performs the display control processing, shown in FIG. 3 and FIG. 4, if the IG-on condition is satisfied, that is, if the ignition switch 142 of the vehicle 200 is on. The emergency notification device 100 first changes the notification mode to the normal mode (step S10) and, at the same time, displays the indicators 113 in the first display mode (first informing mode) corresponding to the normal mode (step S11). In this embodiment, the emergency notification device 100 turns on and displays the green indicator 113G to indicate that the display mode is the first display mode.

Next, the emergency notification device 100 determines whether the notification button 112 is held for a predetermined time (step S12). This predetermined time (for example, a short time of about 40 milliseconds) is set as a time that is short enough to quickly detect that the notification button 112 is held and, at the same time, long enough not to detect that the notification button 112 is held when the operator mistakenly touches the button. If the notification button 112 is held for the predetermined time (step S12=YES), emergency notification is started (step S13). That is, in the normal mode, the depression of the notification button 112 is a trigger to start emergency notification. After that, the emergency notification device 100 disables the detection of the depression of the notification button 112 until the emergency notification is completed. At this time, the emergency notification device 100 blinks the green indicator 113G at 0.25-second intervals to let the operator know that the start of new emergency notification is not accepted until the ongoing emergency notification is completed (step S14).

Next, the emergency notification device 100 waits for the emergency notification to be completed (step S15) and, when the emergency notification is completed (step S15=YES), returns the notification mode to the normal mode and enables the detection of the depression of the notification button 112 again. At this time, the emergency notification device 100 turns on the green indicator 113G again to let the operator know that the emergency notification is completed and that the start of new emergency notification will be accepted (step S16).

Next, the emergency notification device 100 determines whether the ignition switch 142 of the vehicle 200 is switched to off (step S17). If the ignition switch 142 of the vehicle 200 is switched to off (step S17=YES), the emergency notification device 100 turns off the green indicator 113G to let the operator know that the normal mode is terminated (step S18) and terminates the display control processing for the indicators 113.

On the other hand, if the ignition switch 142 of the vehicle 200 is not switched to off (step S17=NO), the emergency notification device 100 determines whether the transit mode start condition is satisfied (step S19). The transit mode start condition refers to a condition that is satisfied when a special vehicle operation, less likely to be performed during a usual travel of the vehicle 200, is performed. In this embodiment, an example of the transit mode start condition is the following two: (1) the vehicle speed of 0 km/h continues for 60 seconds or longer and (2) the headlight on/off operation is detected 10 times. The transit mode start condition may also be a condition that is satisfied when a vehicle operation, which starts the transit mode, is performed via an on-vehicle ECU diagnosis apparatus connected to the vehicle network NW. If the transit mode start condition is not satisfied (step S19=NO), the emergency notification device 100 returns the processing to step S12. The processing in steps S12 to S17 and step S19 are repeated unless the ignition switch 142 of the vehicle 200 is switched to off.

On the other hand, if the transit mode start condition is satisfied (step S19=YES), the emergency notification device 100 changes the notification mode from the normal mode to the transit mode (step S20) and, at the same time, displays the indicators 113 in the second display mode (second informing mode) corresponding to the transit mode (step S21). In this embodiment, the emergency notification device 100 displays the indicators 113 in the second display mode to prompt the operator to transit from the transit mode to the test mode. As the second display mode, the emergency notification device 100 blinks both the red indicator 113R and the green indicator 113G at the same time at one-second intervals.

Next, in the transit mode, the emergency notification device 100 determines whether the notification button 112 is held for a predetermined time (for example, 40 milliseconds) (step S22). If the notification button 112 is held for the predetermined time (step S22=YES), transition to the test mode is started. When the mode transits to the test mode, test notification is automatically started (step S27). That is, in the transit mode, the depression of the notification button 112 is a trigger to transit to the test mode and to start test notification in the test mode. In the transit mode, the notification button 112, if pressed, does not start emergency notification.

On the other hand, if the notification button 112 is not held for the predetermined time (step S22=NO), the emergency notification device 100 determines whether the number of times the red indicator 113R and the green indicator 113G blink has reached a predetermined number of times (for example, five times) (step S23). That is, in this embodiment, the emergency notification device 100 determines whether a predetermined time (for example, ten seconds) has elapsed after the start of the transit mode based on the number of times the indicators 113 and 113G blink. If the number of times the indicators 113R and 113G blink has not yet reached the predetermined number of times (step S23=NO), the emergency notification device 100 returns the processing to step S22 and, until the number of times the indicators 113R and 113G blink reaches the predetermined number of times, monitors whether the notification button 112 is held for the predetermined time.

On the other hand, if the number of times the indicators 113R and 113G blink has reached the predetermined number of times (step S23=YES), the emergency notification device 100 turns off the red indicator 113R and the green indicator 113G so that the operator is not prompted to start transition from the transit mode to the test mode (step S24).

After that, in the transit mode, the emergency notification device 100 determines whether the notification button 112 is held for a predetermined time (for example, 40 milliseconds). If the notification button 112 is not held for the predetermined time (step S25=NO), the emergency notification device 100 determines whether an additional period of time (for example, five seconds) has elapsed after the indicators 113R and 113G are turned off in step S24 described above (step S26). If the additional period of time has not yet elapsed after the indicators 113R and 113G are turned off (step S26=NO), the emergency notification device 100 returns the processing to step S25 and, until the addition period of time elapses after the indicators 113R and 113G are turned off, monitors whether the notification button 112 is held for the predetermined time. On the other hand, if the additional period of time has elapsed without the notification button 112 being pressed after the indicators 113R and 113G are turned off (step S26=YES), the emergency notification device 100 determines that a timeout is generated and returns the processing to step S10 to change the notification mode to the normal mode so that the operator can send an emergency notification any time the operator wants to.

That is, in the transit mode, transition to the test mode is allowed only for a predetermined period of time, more specifically, only for 15 seconds after the start of the transit mode and, after that period of time has elapsed, the mode transits to the normal mode. Note that the predetermined period includes the additional period of time after the termination of the display of the indicators 113R and 113G in the second display mode corresponding to the transit mode. This means that, after the display of the indicators 113R and 113G in the second display mode corresponding to the transit mode is terminated, there is a time lag between the transit mode and the transition to the normal mode.

If the notification button 112 is held for the predetermined time from the time the indicators 113R and 113G are turned off to the time the additional period of time elapses (step S25=YES), transition to the test mode is started. When the mode transits to the test mode, test notification is automatically started (step S27). At this time, the emergency notification device 100 displays the indicators 113R and 113G in the third display mode (third informing mode) corresponding to the test mode (step S28). In this embodiment, the emergency notification device 100 displays the indicators 113R and 113G in the third display mode to let the operator know that the mode transits to the test mode and test notification is automatically started. The emergency notification device 100 blinks the green indicator 113G at 0.5-second intervals to indicate that the display mode is the third display mode. In this embodiment, the depression of the notification button 112 is disabled in the test mode, meaning that the notification button 112, if pressed, does not start emergency notification.

Next, the emergency notification device 100 determines whether the test notification is completed (step S29). If the test notification is completed (step S29=YES), the emergency notification device 100 returns the processing to step S10 to change the notification mode to the normal mode so that the operator can send an emergency notification any time the operator wants to. On the other hand, if the test notification is not yet completed (step S29=NO), the emergency notification device 100 determines whether the vehicle 200 has traveled a predetermined distance (300 m in this embodiment) after transition to the test mode (step S30).

This predetermined distance is a criterion value used to determine whether the vehicle 200 has started traveling. For example, even when a detection error in the traveling position of the vehicle 200, detected by the GPS 146, is taken into consideration, this predetermined distance is set as a value large enough to correctly determine whether the vehicle 200 has started traveling. If the vehicle 200 has already traveled the predetermined distance or longer (step S30=YES), it is determined that, because the vehicle 200 has started traveling, the operator must be able to send an emergency notification any time the operator wants to. Therefore, the emergency notification device 100 returns the processing to step S10 to change the notification mode to the normal mode.

On the other hand, if the vehicle 200 has not yet traveled the predetermined distance or longer (step S30=NO), the emergency notification device 100 determines whether the ignition switch 142 of the vehicle 200 is switched to off (step S31). If the ignition switch 142 of the vehicle 200 is not switched to off (step S31=NO), the emergency notification device 100 returns the processing to step S29 and, unless the ignition switch 142 of the vehicle 200 is switched to off, repeats steps S29 to S31. On the other hand, if the ignition switch 142 of the vehicle 200 is switched to off (step S31=YES), the emergency notification device 100 turns off the green indicator 113G to let the operator know that the normal mode is terminated (step S32) and terminates the display control processing for the indicators 113.

Next, an example of the operation of the emergency notification device 100 in this embodiment is described below with reference to FIG. 5A to FIG. 5F, FIG. 6A to FIG. 6F, and FIG. 7A to FIG. 7F, with particular emphasis on an example in which the notification mode is switched. FIG. 5A to FIG. 5F are timing diagrams showing the operation when the notification button 112 is pressed while the indicators 113R and 113G blink in the second display mode in the transit mode and the mode transits to the test mode. FIG. 6A to FIG. 6F are timing diagrams showing the operation when the notification button 112 is pressed after the indicators 113R and 113G terminate blinking in the second display mode in the transit mode and the mode transits to the test mode. FIG. 7A to FIG. 7F are timing diagrams showing the operation when the notification button 112 is not pressed in the transit mode and the mode does not transit to the test mode.

In the description below, it is assumed that the state of "vehicle speed of 0 km/h" continues "60 seconds or longer". First, as shown in FIG. 5A and FIG. 5B, each time the light switch 143 is turned and on and off repeatedly in a short time (for example, within 10 seconds or shorter), more in detail, each time the light switch 143 is turned off, the value of the counter in the control unit 120 increments. At time t1 when the value of the counter reaches 10, the notification mode transits from the normal mode to the transit mode as shown in FIG. 5F.

At this time, as shown in FIG. 5C and FIG. 5D, when the mode transits to the transit mode, the green indicator 113G and the red indicator 113R start blinking in the second display mode. In this case, the red indicator 113R and the green indicator 113G, which blink in the second display mode, prompt the operator to press the notification button 112 to change the mode from the transit mode to the test mode.

That is, this embodiment is configured to allow transition to the test mode only during the period in which the notification mode is the transit mode. Providing this transit mode avoids erroneous notification between emergency notification and test notification. This configuration notifies the operator, through the second display mode of the indicators 113R and 113G, that the current notification mode is the transit mode and that the mode can transit to the test mode.

As shown in FIG. 5E and FIG. 5F, when the on signal of the notification button 112 is detected at time t2 while the indicators 113R and 113G blink, the notification mode transits from the transit mode to the test mode. That is, the mode transits from the transit mode to the test mode as intended by the operator.

When the mode transits to the test mode, the green indicator 113G starts blinking in the third display mode as shown in FIG. 5C and FIG. 5D. The operator is informed, through the third display mode of the green indicator 113G, that the mode transits from the transit mode to the test mode and that test notification is started.

On the other hand, assume that the on signal of the notification button 112 is not detected while the green indicator 113G and the red indicator 113R blink in the second display mode as shown in FIG. 6C to FIG. 6E. In this case, when the number of times the indicators 113R and 113G blink reaches a predetermined number of times (five times) at time t3, the indicators 113R and 113G stop blinking and go off. As a result, the operator is not prompted to press the notification button 112 to transit from the transit mode to the tests mode.

Note that the mode does not transit from the transit mode to the normal mode immediately after the indicators 113R and 113G stop blinking but that the transit mode is maintained for an additional period of time (five seconds) as shown in FIG. 6F. As long as the transit mode is maintained, the transition from the transit mode to the test mode is allowed by pressing the notification button 112. That is, in some cases, the operator attempts to press the notification button 112 in the transit mode immediately before the indicators 113R and 113G stop blinking but, actually, presses the notification button 112 immediately after the indicators 113R and 113G stop blinking. In that case, as long as the transit mode is maintained at time t4 at which the notification button 112 is pressed, the mode transits from the transit mode to the test mode as intended by the operator.

In this case, too, the green indicator 113G starts blinking in the third display mode when the mode transits to the test mode as shown in FIG. 6C and FIG. 6D. The operator is informed, through the third display mode of the green indicator 113G, that the mode transits from the transit mode to the test mode and that test notification is started.

On the other hand, as shown in FIG. 7C to FIG. 7F, if the notification button 112 is not yet pressed even at time t5 at which the additional period of time (five seconds) has elapsed from the time the indicators 113R and 113G stop blinking, the mode transits from the transit mode to the normal mode.

In this case, as shown in FIG. 7C and FIG. 7D, when the mode transits to the normal mode, the green indicator 113G is turned on in the first display mode. Because the mode transits from the transit mode to the normal mode, the operator is informed, through the first display mode of the green indicator 113G, that the operator can start emergency notification by pressing the notification button 112.

The informing method described above, which differs from mode to mode, is implemented by the indicators 113R and 113G and the notification button 112 that constitute a part of the general user interface employed on a wide variety of vehicles. Therefore, the versatility of this informing method is high. Even when the emergency notification device 100 is already mounted on the vehicle 200, the informing method described above, which differs from mode to mode, can be easily implemented simply by updating the display control program of the indicators 113R and 113G provided on the emergency notification device 100.

When the emergency notification device 100 has a display unit via which information that differs from mode to mode is displayed, the durability of that display unit is not sufficiently reliable especially after the vehicle 200 collides. In contrast, because the informing processing in this embodiment is implemented by a relatively simple configuration in which the display mode of the indicators 113R and 113G is changed, the operation is sufficiently reliable even after the vehicle 200 collides.

As described above, the embodiment achieves the following effects.

(1) The transit mode is provided to allow transit (switching) from the normal mode to the test mode. Therefore, though one user interface is used for both emergency notification and test notification, the emergency notification device allows transition to the test mode only during the period of the transit mode, suitably avoiding erroneous notification between emergency notification and test notification. The guide to each of the notification modes is given by the informing processing of the indicators 113R and 113G that differs from operation mode to operation mode. Therefore, the operator knows in which mode the emergency notification device 100 is operating now. In addition, this function of the emergency notification device 100 can be implemented without having to add a new user interface.

(2) If the predetermined time elapses without performing any operation after transition to the transit mode, a timeout is generated and the mode is returned from the transit mode to the normal mode. This allows the operator to send an emergency notification in the normal mode any time the operator wants to.

(3) In the transit mode, even after the corresponding informing period is terminated, transition from the normal mode to the test mode is allowed until the additional period of time elapses. This additional period of time in the transit mode results in an increased chance of transiting to the test mode. Providing this additional period of time suitably avoids a situation in which the operator, who intends to send a test notification in the transit mode, erroneously sends an emergency notification.

(4) A pushbutton switch is used as the notification button 112. This pushbutton switch makes the emergency notification device 100 more general and enables the operator to start emergency notification and test notification using a user interface more popular in configuration and superior in operability.

(5) The mode transits to the test mode in such a way that the operator holds the notification button 112 for a predetermined time or longer to sufficiently reflect operator's intention and, when the mode transits to the test mode, test notification is started.

(6) The informing processing, which differs from mode to mode, is performed through the indicators 113R and 113G that are illuminants. This enables the emergency notification device 100 to implement the informing processing that differs from mode to mode with the use of a popular user interface.

(7) The informing processing that differs from mode to mode includes different blinking modes of the indicators 113R and 113G. Therefore, based on a blinking mode of the indicators 113R and 113G, the operator intuitively knows the contents of the notification mode corresponding to the blinking mode.

(8) A predetermined vehicle operation that causes a trigger to the transit mode is a special vehicle operation that is less likely performed in usual driving. In general, such a special operation is not required in most cases. Therefore, such a special operation, suited for a trigger to the transit mode, is used to allow the operator to reliably transit to the transit mode through that special operation.

The embodiment described above may also be performed in the following modes.

In the above embodiment, a combination of indicators (red indicator 113R and/or green indicator 113G) that are turned on may be changed to implement informing processing that differs from mode to mode.

In the above embodiment, if the emitting light colors of the indicators 113 can be switched, the emitting light colors may be changed to implement informing processing that differs from mode to mode.

In the above embodiment, even if the configuration includes only one indicator, the display mode of turning on or blinking the indicator may be changed to implement informing processing that differs from mode to mode.

In the above embodiment, the voice output mode of the speaker 111, one of the user interfaces of the emergency notification device 100, may be changed to implement informing processing that differs from mode to mode.

In the above embodiment, if the operation on the notification button 112 can be detected quickly, removing the operator's finger from the notification button 112 in the transit mode may be used as a trigger to transit to the test mode.

In the above embodiment, if a notification button configured by a contact-type sensor is provided as one of the user interfaces of the emergency notification device 100, the notification mode may transit to the test mode when the operator touches the notification button in the transit mode.

In the above embodiment, the indicators 113R and 113G corresponding to the transit mode may be continuously displayed throughout the transit mode. In this case, when a timeout occurs in the transit mode, the notification mode transits from the transit mode to the normal mode immediately after the display of the indicators 113R and 113G corresponding to the transit mode is terminated.

In the above embodiment, the transition from the transit mode to the normal mode need not necessarily be performed based on the elapsed time from the start of the transit mode. For example, the transit may be performed if a predetermined operation is performed on the vehicle in the transit mode.

In the above embodiment, test notification need not necessarily be started automatically when the notification mode transits to the test mode. For example, pressing the notification button after transition to the test mode may be used as a trigger to start test notification.

What is claimed is:

1. An on-vehicle emergency notification device that is configured to be mounted on a vehicle and that performs emergency notification and test notification through one user interface, the on-vehicle emergency notification device comprising:

an electronic control unit that operates in a normal mode, a test mode, and a transit mode and is configured to cause an informing unit that is part of the one user interface to perform a first informing processing when in the normal mode, a second informing processing when in the test mode, and a third informing processing when in the transit mode, the second informing processing being different from the first informing processing, the third informing processing being different from the first informing processing and being different from the second informing processing, the normal mode being a mode in which the emergency notification is permitted to be performed to send an emergency notification signal to a center in response to an operation of an operation unit that is a part of the one user interface when an urgent event occurs on the vehicle, the test mode being a mode in which the test notification is permitted to be performed to diagnose whether the emergency notification can be performed in response to the operation of the operation unit, and the transit mode being a mode in which transition from the normal mode to the test mode is permitted to be performed, the transit mode being triggered by a predetermined vehicle operation, wherein each of the first, second and third informing processings is perceptible by a human.

2. The on-vehicle emergency notification device according to claim 1, wherein when in the transit mode, the electronic control unit permits the transition to be performed from the normal mode to the test mode only during a predetermined period of time after occurrence of the predetermined vehicle operation.

3. The on-vehicle emergency notification device according to claim 2, wherein the predetermined period of time includes an additional period of time after the third informing processing corresponding to the transit mode is terminated.

4. The on-vehicle emergency notification device according to claim 1, wherein the operation unit is a pushbutton switch.

5. The on-vehicle emergency notification device according to claim 4, wherein the electronic control unit transitions to the test mode in a case where the pushbutton switch is held for at least a predetermined time while in the transit mode.

6. The on-vehicle emergency notification device according to claim 1, wherein the informing unit includes illuminants.

7. The on-vehicle emergency notification device according to claim 6, wherein the first informing processing, the second informing processing and the third informing processing performed by the informing unit that are different for each of the normal, test and transit modes include different blinking modes of the illuminants.

8. The on-vehicle emergency notification device according to claim 1, wherein the predetermined vehicle operation that triggers the transit mode is a special vehicle operation that is unlikely to be performed during usual driving.

9. A communication system comprising:

an operation unit that detects a user operation;

a communication device that operates in at least a first operation mode, a second operation mode, and a third operation mode, the first operation mode being a mode in which a predetermined communication is carried out when the operation unit is operated, the second operation mode being a mode in which a capability of the communication system to perform the predetermined communication is tested, and the third operation mode being a mode in which switching from the first operation mode to the second operation mode is permitted; and an informing unit that performs a first informing processing when the communication device is in the first operation mode, a second informing processing when the communication device is in the second operation mode, and a third informing processing when the communication device is in the third operation mode, the second informing processing being different from the first informing processing, the third informing processing being different from the first informing processing and being different from the second informing processing, wherein each of the first, second and third informing processings is perceptible by a human.

10. The communication system according to claim 9, wherein the informing unit includes a first informing unit that informs about a normal operation of the communication device and a second informing unit that informs about a failure in the communication device.

* * * * *